(12) United States Patent
Sham (10) Patent No.: US 10,668,819 B2
(45) Date of Patent: Jun. 2, 2020

(54) ENHANCED WIRELESS CHARGING (71) Applicant: Wellen Sham, Taipei (TW)

(72) Inventor: Wellen Sham, Taipei (TW)

( * ) Notice: Subject to any disclaimer, the term of this patent is extended or adjusted under 35 U.S.C. 154(b) by 12 days.

(21) Appl. No.: 15/601,688

(22) Filed: May 22, 2017

(65) Prior Publication Data

US 2018/0334039 A1 Nov. 22, 2018

(51) Int. Cl.
*H02J 50/20* (2016.01)
*H02J 50/30* (2016.01)
*H02J 7/02* (2016.01)
*B60L 11/18* (2006.01)
*B60L 53/10* (2019.01)
*B60L 53/30* (2019.01)
*B60L 53/35* (2019.01)

(52) U.S. Cl.
CPC ............ *B60L 11/182* (2013.01); *B60L 53/10* (2019.02); *B60L 53/30* (2019.02); *B60L 53/35* (2019.02); *H02J 7/025* (2013.01); *H02J 50/20* (2016.02); *H02J 50/30* (2016.02); *Y02T 10/7005* (2013.01); *Y02T 10/7072* (2013.01); *Y02T 10/7083* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ......... B60L 11/182; H02J 50/30; H02J 7/025; H02J 50/20
USPC ........................................................ 320/109
See application file for complete search history.

(56) References Cited

U.S. PATENT DOCUMENTS

| | | | | |
|---|---|---|---|---|
| 2004/0142733 A1* | 7/2004 | Parise | ................... | B01F 5/0614 455/572 |
| 2004/0222903 A1* | 11/2004 | Li | ............................. | G08G 1/14 340/932.2 |
| 2009/0045773 A1* | 2/2009 | Pandya | ................... | B60L 5/005 320/108 |
| 2011/0285349 A1* | 11/2011 | Widmer | ................ | B60L 11/182 320/108 |
| 2013/0344588 A1* | 12/2013 | Halushka | ............. | C12Q 1/6804 435/309.1 |
| 2016/0285298 A1* | 9/2016 | Olgun | ..................... | H02J 7/027 |
| 2017/0136890 A1 | 5/2017 | Ricci | | |

OTHER PUBLICATIONS

Non Patent Literature "EV Charging Overview" ("EV"), Nissan, Feb. 2010.*
European Search Report dated Oct. 15, 2018 in the corresponding EP application (application No. 18173645.5).

* cited by examiner

*Primary Examiner* — David V Henze-Gongola
(74) *Attorney, Agent, or Firm* — Kilpatrick Townsend & Stockton, LLP (57) ABSTRACT

Embodiments facilitate wireless charging of the EV by using a charging method that employs higher voltages with higher power transmission rate than induction wireless charging. A few charging methods satisfying such criteria are provided: including microwave and laser charging. Components may be designed to facilitate charging of EVs using such methods. For example, components may be designed to create a vacuum between a power transmitter fixed to parking spot and a power receiver fixed to the EV. The microwave or laser may be transmitted through this vacuum.

20 Claims, 6 Drawing Sheets

ENHANCED WIRELESS CHARGING

BACKGROUND OF THE INVENTION

This invention relates generally to vehicle charging.

An electric vehicle charging station, also called EV charging station, electric recharging point, charging point, or charge point and EVSE (electric vehicle supply equipment), is an element in an infrastructure that supplies electric energy for the recharging of electric vehicles, such as plug-in electric vehicles, including electric cars, neighborhood electric vehicles and plug-in hybrids. As electric vehicles and battery electric vehicle ownership is expanding, there is a growing need for widely distributed publicly accessible charging stations, some of which support faster charging at higher voltages and currents than are available from residential EVSEs. Many charging stations are on-street facilities provided by electric utility companies or located at retail shopping centers and operated by many private companies. These charging stations provide one or a range of heavy duty or special connectors that conform to the variety of electric charging connector standards.

With the growth of electric vehicle ownerships, the present infrastructure of EV charging stations would soon be unable to support charging EVs. Some electric utilities have reported numbers that indicate that even a single 220V charger within the circuit served by a transformer may, during peak consumption hours, overload and burn out the transformer. Therefore, the existing infrastructure needs to be upgraded both from a capacity standpoint as well as from a flexibility and power routing and control standpoint. While it is foreseeable that the infrastructure of EV charging would expand as to the number of power lines and the number of EV charging stations, there is also a need to improve charging of the individual EVs. For example, unlike the traditional gas stations, EV charging stations may not be expanded in areas due to constraints of a local power grid. Gas can be ported by a truck to wherever the gas station may be and stored, electricity may not be transmitted to EV stations above the capacity of the power grid. Therefore, there is a need to improve charging of the individual EVs through the EV charging stations.

BRIEF SUMMARY OF THE INVENTION

Embodiments facilitate wireless charging of an electric vehicle by using a charging method that employs higher voltages with higher power transmission rate than induction wireless charging. A few charging methods satisfying such criteria are provided: including microwave and laser charging. Components may be designed to facilitate charging of EVs using such methods. For example, components may be designed to create a vacuum between a power transmitter in a parking spot and a power receiver fixed to an EV. The microwave or laser may be transmitted through this vacuum.

In some embodiments, a charging station for enhanced wireless charging is provided. In those embodiments, the charging station may include a parking spot, which may include control unit, a vacuum generator, a hollowed-out component, a power transmitter and/or any other components. The control unit may be configured to receive a request to charge an electric vehicle. In response to the request being received, the control unit may generate an instruction to create a vacuum between a parking spot and the electric vehicle through the hollowed-out component. In response to the vacuum being created, the control unit may generate an instruction to convert the electric power received from a power grid to a radio medium having a frequency higher than 500 megahertz such that the radio medium is transmitted from the power transmitter to the electric vehicle through the vacuum. In some implementations, the radio medium is microwave. In some implementations, the radio medium is laser.

In some embodiments, an electric vehicle (EV) configured for enhanced wireless charging is provided. In those embodiments, the EV may include a control unit, a vacuum generator, a hollowed-out component, a power transmitter and/or any other components. The control unit may be configured to generate a request to charge an electric vehicle. The control unit may generate an instruction to receive through the power transmitter a radio medium having a frequency higher than 500 megahertz. The radio medium may be wirelessly received from a power transmitter of a charging station through a vacuum created between the charging station and the electric vehicle through the hollow-out component. In some implementations, the radio medium is microwave. In some implementations, the radio medium is laser.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION OF THE INVENTION

Embodiments can provide a system for wirelessly charging EV. Induction wireless charging techniques have been developed to charge an EV. Induction wireless charging typically involves running electricity through a coil of wire. This creates a magnetic field, which allows the current to be transferred between two coils without any physical connection. In the case of wireless electric-car charging through induction, two component pads are used: one is fixed on the ground and the other is mounted on the underside of the EV. While this method of charging works pretty well for smaller devices like smart phones and tablet computers, it is more difficult to charge an EV using this method due to the higher wattage necessary. A few challenges are presented by this method to charge the EV. First, the charging speed is much slower than wired charging (e.g., traditional plugging the EV to a power outlet). Traditionally, electric power transfer rate under this method is around 3-5 kilo watts per hour. Even with recent development in wireless induction charging, the power transfer rate has only been increased to 12 kilo watts per hour, which is still too slow for charging an EV. Depending on the battery capacity of the EV, it could take more than 12 hours to fully charge the EV. This is not desirable since typical idle time for an EV is less than 12 hours—e.g., the EV is charged when the driver is at work or at home.

The second challenge is somewhat related to the first. That is, since the charging speed under current wireless charging technology for an EV is slow, it takes longer time to charge the EV, which in turn could impose higher stress to a power grid. This makes intuitive sense. Most drivers will charge their EVs either at work or at home. Roughly, 50% of the EVs in one area will be charged during the day and the other 50% EVs will be charged during the night. Since these EVs will be charged for almost the entirety of the day or night, this would cause a constant power demand on the power grid serving that area. Power grids are rigid structures that are not easily expandable. It is difficult to increase capacity of a power grid continuously as more and more households are switching to EVs.

However, wireless charging is desired. As driver-less self-driving technologies are maturing, an EV may be parked by itself and charged wirelessly without a human operator. It is desirable for a driver to leave his/her EV at the front door of his/her home or workplace; and let the EV drives itself to an empty parking spot and charge itself wirelessly while the driver is at work or home. The driver may pick up the EV when he/she is ready to go home or go to work with the EV being fully charged. However, this scenario will work well only if the wireless charging speed of the EV is improved.

One insight provided by the inventor(s) of this disclosure is that wireless charging of the EV can be improved by using a charging method that employs higher voltages with higher power transmission rate than induction wireless charging. A few charging methods satisfying such criteria will be described in this disclosure: including microwave and laser charging. These methods are typically known for long distance high frequency wireless charging. However, they may be employed to charging EVs. Components may be designed to facilitate charging of EVs using such methods. For example, components may be designed to create a vacuum between a power transmitter fixed to parking spot and a power receiver fixed to the EV. The microwave or laser may be transmitted through this vacuum.

Figure 1:
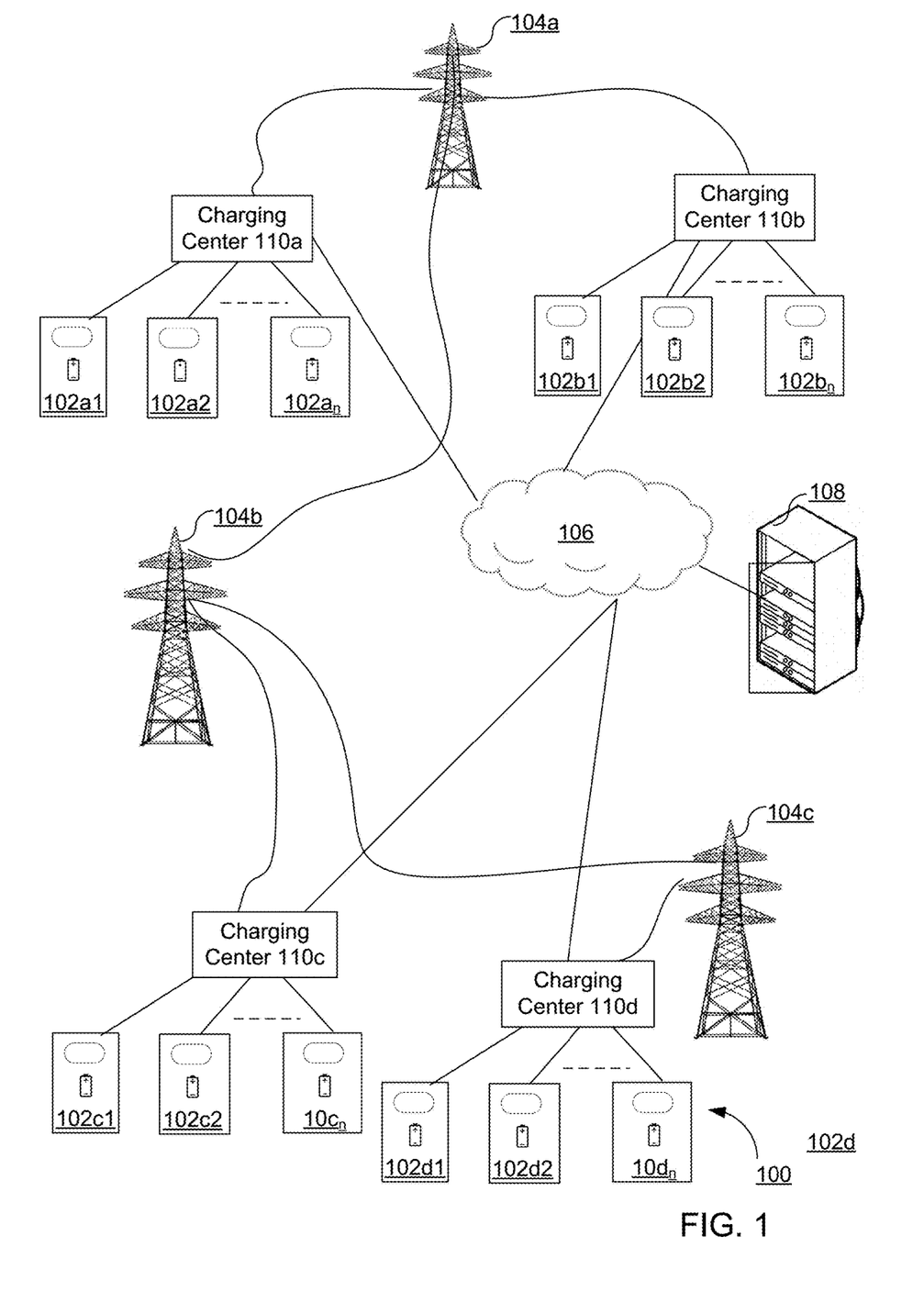
FIG. 1 generally illustrates an example of an EV charging station network in accordance with the disclosure.

FIG. 1 generally illustrates an example of an EV charging station network 100 in accordance with the disclosure. As shown, the EV charging network 100 can include one or more EV charging stations 102, such as 102a-e shown in FIG. 1. As also shown, a given EV charging station 102, such as 102a, may be connected to a corresponding charging center 110, such as 110a, which in turn can be connected with a corresponding power transmission tower 104, such as 104a. The power transmission towers 104a-c may be connected to a same power grid or different power grids and may transmit electric power to the EV charging stations through the power lines.

As shown, the charging centers 110, such as charging center 110a-d, shown in this example, can obtain electric power from the power transmission towers 104, such as 104a-d. In some embodiments, a given charging center 110, such as charging center 110a may be equipped with one or more batteries that can be charged through the power transmission towers 104. In some embodiments, the given charging center 110 may be equipped with solar panels such that the one or more batteries in the given charging center 110 may be charged through the solar panels during the day. In those embodiments, the batteries included in the given charging center 110 may be charged through the power transmission towers 104 during the night. In this way, the batteries in the given charging center 110 can be charged continuously in an energy efficient way.

Information regarding an individual EV charging station 102, such as 102a, can be gathered in the network 100. The information regarding a given EV charging station 102 can include one or more charging modes supported by given charging station 102. For example, the given EV charging station 102a may support a fast mode that may allow an empty battery of an EV to be charged within minutes, a regular mode that may allow the batty to be charged within one hour or so, a slow mode that may allow the battery to be charged within a few hours, and/or any other mode(s). The information regarding the given EV charging station 102 can include availability of the given EV charging station 102. The availability may indicate during which time slots the given EV charging station 102 is available for a particular mode of charging. For example, the EV charging station 102 may have already been reserved for two charging sessions for two different EVs and there is a 45 minute window between the two charging sessions. In that example, the information regarding the given EV charge station 102 may indicate that the EV charging station is available to charge an EV in a fast mode for 45 minutes.

The information regarding the individual EV charging station 102 may include information indicating certain type or types of EVs that that can be wirelessly charged by the given EV charging station 102. In accordance with various EV standards, there may be different battery capacities and different charge methods for the EVs. The information regarding the given EV charging station 102 may indicate what types of EVs that can be wirelessly charged by the given charging station 102.

The information regarding the individual EV charging station 102 may include information indicating a location of the individual EV charging station 102. The location information may include coordinate information that can be used by a mobile device (such as a smart phone) to locate the EV charging station 102, surrounding information (e.g., the EV charging station 102 is located in a shopping mall), road information (e.g., one or more access roads to EV charging station 102), and/or any other information. Such information can be used to determine if the location of the EV charging station 102 is suitable for charging a given EV. For example, if the location information indicating the EV charging station is located in a shopping mall that has business hours between 9 am-9 pm, it may be determined that EV charging station is not suitable for charging an EV overnight in a slow mode.

In some embodiments, for storing and collecting the information described above, the EV charging station 102 may be equipped with necessary hardware. For example, one or more chips may be embedded in a given EV charging station 102, and the chips may be configured to store the location information of the given EV charging station 102, the type of EVs that can be supported by the given EV charging station 102, and/or any other static information regarding the given EV charging station 102. In those embodiments, the chips can be configured to collect dynamic information regarding the given charging station 102, such as the current schedule of the EV charging station, the current load on the EV charging station and/or its power grid, and/or any other dynamic information. In some implementations, the individual EV charging stations 102 in the network 102 may be operatively connected to a corresponding monitoring device, for example a computer located near the EV charging stations 102. In one implementation, it is contemplated that the computer can be operated by a human operator. In that implementation, the human operator can log the dynamic information regarding the EV charging station(s) monitored by the human operator.

The information regarding the individual EV charging stations 102 can be transmitted to one or more of a server 108 over a communications network 106 periodically or continuously. The communications network 106 may include a wireless network. For example, the individual EV charging stations 102 in the network 100 may be equipped with wireless communication capability such that they transmit its location information, capacity information, schedule information to the server 108 periodically, for example once every 10 minutes. In some implementations, the communications network 106 may include a backbone network much like the cellular network infrastructure. One skilled in the art will understand different infrastructures of the communications network 106.

Figure 2:
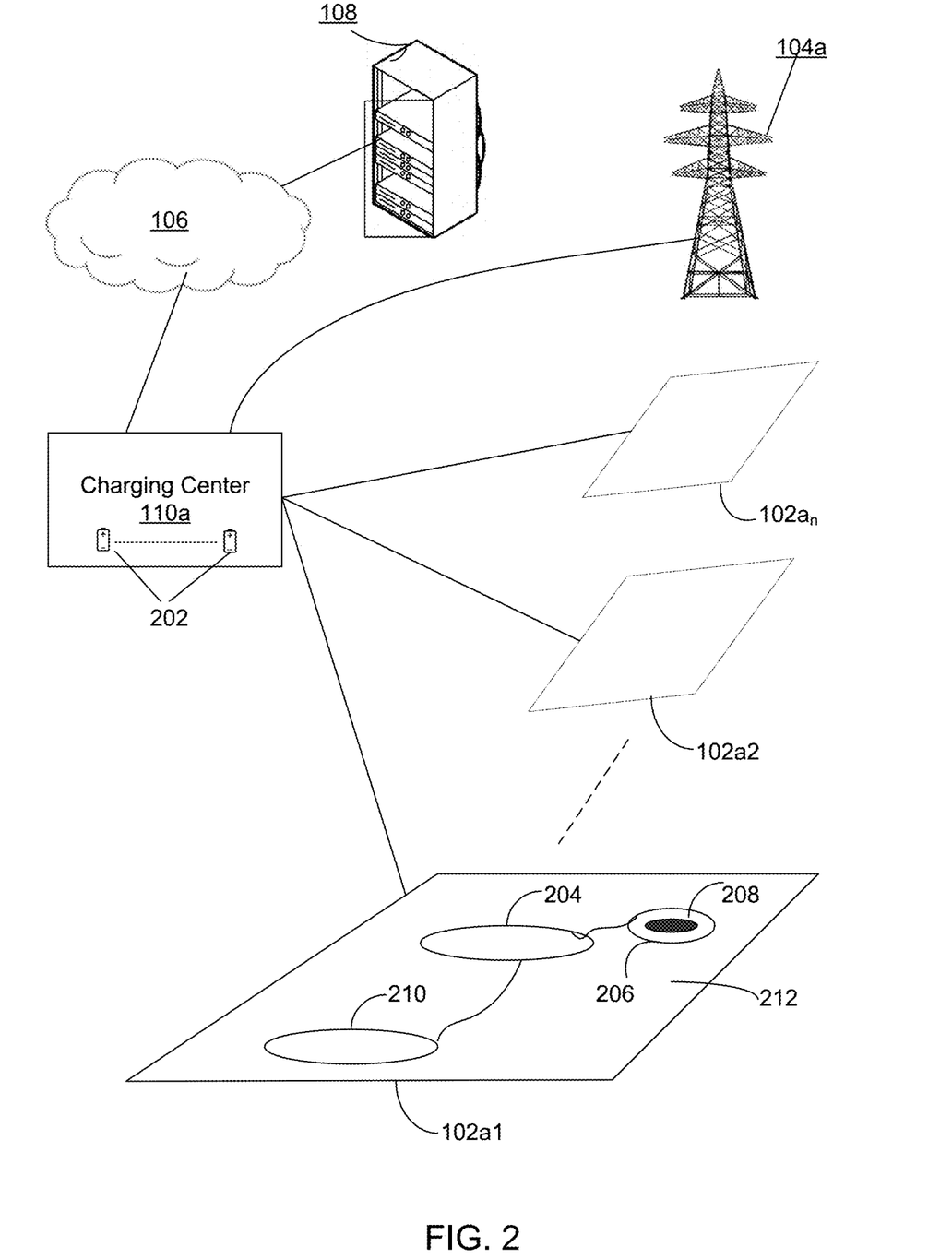
FIG. 2 illustrates one example of a charging station that is configured to facilitate enhanced wireless charging in accordance with the disclosure.

FIG. 2 illustrates one example of a charging center shown in FIG. 1 and configured to facilitate enhanced wireless charging in accordance with the disclosure. As shown, in this example, the charging center 110*a* is connected to a power grid through the power transmission tower 104*a*. In some embodiments, the charging center 110*a* can be equipped with solar panels. In those embodiments, the batteries 202 included in the charging center 110 can be charged by the solar panels during the day and can be charged during through the power transmission power 104*a* during the night. As also shown, the charging center 110*a* can be connected to the server 108 via the communications network 106. The server 108 may be configured to generate and transmit instructions to the charging center 110*a* for charging individual EVs.

As still shown in FIG. 2, the charging center 110*a* can be configured to be connected to one or more wireless charging stations, such as 102*a*$_1$ to 102*a*$_n$ shown in this example. A given charging station, such as 102*a*$_1$, may comprise a parking spot 212, a vacuum generator 204, a hollowed-out component 206, a power transmitter 208, a control unit 210 and/or any other components. A given vehicle may be parked on the parking spot 212 and can be charged through the batteries in the charging center 110*a* or directly charged by the power grid through the charging center 110*a*.

The parking spot 212 may include any regular parking spot commonly found in any residence or commercial parking lots or structures. One advantage provided by this disclosure is that any existing parking spot may be retrofitted to facilitate the enhanced wireless charging in accordance with the disclosure. For example, an asphalt or concrete parking spot can be retrofitted to embed wires and other components such as 204, 206, 208 and 210 to facilitate the enhanced wireless charging in accordance with the disclosure.

The control unit 210 may be configured to receive and generate instructions. For example, the control unit 210 may be configured to receive a charging request in response to an EV having been detected as being present on parking spot 212. In response to receiving the charging request, the control unit 210 may be configured to generate an instruction to the vacuum generator 204 to generate a vacuum through the hollowed-out component 206. The control unit 210 may be configured to generate an instruction to convert electricity received from the tower 104*b* to microwave or laser. The control unit 210 may generate an instruction to activate microwave or laser transmission through the power transmitter 208. The control unit 210 may generate an instruction to deactivate the microwave or laser transmission in response to receiving an indication that the battery or batteries of the EV are fully charged.

It should be understood although various functions are described herein as being attributed to control unit 210, this is merely illustrative. In some other implementations, several separate components may be employed to perform these functions. For example, a separate power transmission component may be used to control activation and/or deactivation of the power transmission through power transmitter 208. A request component may be employed to detect whether an EV is present on parking spot 212 and requesting to be charged. A separate power conversion component may be employed to convert the electricity to microwave or laser for transmission to the EV. Other components are contemplated.

Figure 4:
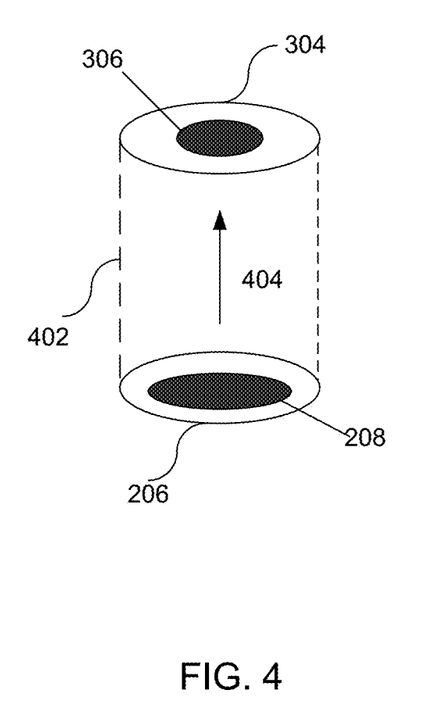
FIG. 4 illustrates one example of a vacuum generated between the hollowed-out components of the charging station shown in FIG. 2 and the EV shown in FIG. 3.

The vacuum generator 204 may be configured to generate a vacuum through the hollowed-out component 206. The vacuum generated by the vacuum generator 204 is a volume of space between the hollowed-out component 206. An illustration a vacuum 402 that can be created by vacuum generator 204 is shown in FIG. 4. It will be described in further detail in connection with FIG. 4. In implementations, the vacuum generator 204 may be configured to generate compressed air flows and transmit the compressed air flows to the hollowed-out component 206.

The hollowed-out component 206 may include an air nozzle, an air ejector, and/or any other parts. The constriction in the air nozzle may increase the low velocity of the air to supersonic speed. After exiting the air nozzle, the air expands and flows through the receiver nozzle (mounted on the chassis of the EV). The vacuum can be thus created between the parking spot 212 and the EV.

The power transmitter 208 can be configured to transmit microwave or laser converted from electricity to a power receiver of the EV. Microwave power transmission (MPT) in accordance with the disclosure is the use of microwaves to transmit electric power through the vacuum 402 illustrated in FIG. 4. Laser power transmission in accordance with the disclosure involves converting electricity into a laser beam that is then pointed at a photovoltaic cell included in the power receiver of the EV.

Figure 3:
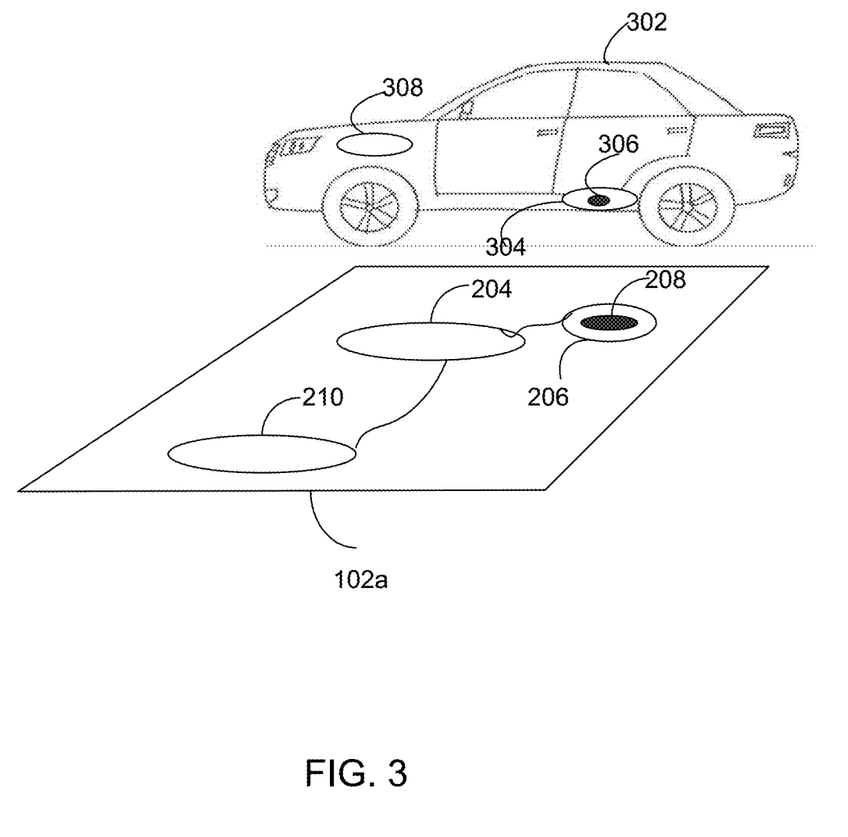
FIG. 3 illustrates one example of an EV configured for the enhanced wireless charging in accordance with the disclosure.

With the structure of a charging station 102 configured for enhanced wireless charging having been generally described, attention is now directed to FIG. 3. FIG. 3 illustrates one example of an EV 302 configured for the enhanced wireless charging in accordance with the disclosure. As shown, the EV 302 may comprise a hollowed-out component 304, a power receiver 306, a control unit 308, and/or any other components.

The hollowed-out component 304 may include an air nozzle and/or any other parts. This air nozzle can be the counterpart to the air nozzle in the hollowed-out component 206 in the parking spot 212. The hollowed-out component 304 may be mounted on or in a chassis of the EV 302. In various implementations, the position of the hollowed-out component 304 may vary. In one implementation, the size of the hollowed-out component 304 may be smaller than the hollowed-out component 206. In one implementation, the hollowed-out component 206 may be located at bottom left portion of the parking spot 212 and the hollowed-out component 304 may be located at bottom left portion of the EV 302. Other configurations of the hollowed-out components 304 and 206 are contemplated.

The power receiver 306 is the counterpart to the power transmitter 208 in the parking spot 212. In some implementations, the power receiver 306 may be configured to receive microwave transmitted from the power transmitter 208. In some implementations, the power receiver 306 may be configured to receive laser transmitted from the power transmitter 208. In those implementations, the power receiver 306 may include a photovoltaic cell.

FIG. 4 illustrates one example of a vacuum 402 generated between the hollowed-out components 206 and 304. As described, the vacuum 402 may be generated by a vacuum generator 204 included in the parking spot 212. As shown, in some implementations, microwave 404 may be transmitted from the power transmitter 208 to the power receiver 306. In some implementations, laser 404 may be transmitted from the power transmitter 208 to the power receiver 306. In any case, the power transfer rate may be controlled between 20 kilo watts per hour to 60 kilo watts per hour. To facilitate this, a high voltage transmission may be employed. In some implementations, the voltage employed in the enhanced wireless power transmission in accordance with disclosure is between 400 to 800 volts. In this way, the charging speed can be improved comparing to the induction wireless charging method where pads with coils are used. For example, at 32 kilo watts power transmission rate under the enhanced wireless charging in accordance with the disclosure, the charging speed can be almost doubled as compared to the induction wireless charging. In some implementations, the vertical distance between the hollowed-out components 206 and 306 may be less than one foot. It should be understood this distance is not intended to be limiting. In some other implementations, the distance between the hollowed-out components 206 and 306 may be larger than one foot.

Figure 5:
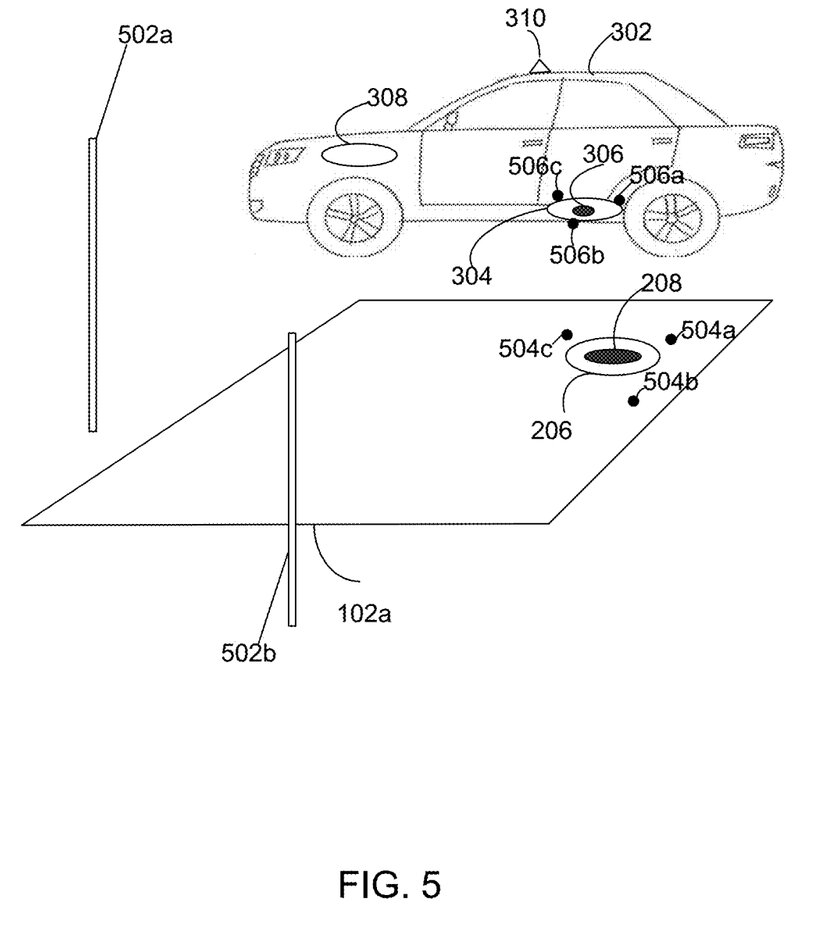
FIG. 5 illustrates one exemplary implementations for aligning vehicle with charging station for charging the vehicle in accordance with the disclosure.

Alignment of the hollowed-out components 206 and 304 may be desired for creating an efficient vacuum 402. Misalignment can lead to the vacuum 402 not being able to be created or the size and/or volume of the vacuum 402 being reduced. However, a perfect alignment of these components are also not necessary. The design of the charging station 102a in accordance with the disclosure may account for some level of alignment tolerance. A number of methods may be implemented to align hollow-out components 206 and 304. FIG. 5 illustrates one exemplary implementations for aligning vehicle 302 with charging station 102 for charging the vehicle 302 in accordance with the disclosure. For example, one or more guide posts, such as 502a and 502b as shown in FIG. 5, may be fixed around charging station 102a. These guide posts may be used to provide one or more reference points for vehicle 302. For instance, the vehicle 302 may be equipped with one or more cameras 310 to capture images of the guide posts. Such images may be used to guide the vehicle 302 into charging station 102a. As illustration, in implementations, such images may be "fed" to the self-driving system of the vehicle 302a. As the self-driving system of the vehicle 302 already has image analysis capability, the positions of the guide posts 502 can be determined to enable the vehicle 302 to drive itself into the charging station 102.

In some implementations, the alignment facilitated by the guide posts 502 may not be sufficient to create the vacuum 402 as shown in FIG. 4 for charging vehicle 302. In those implementations, one or more sensors 504 may be positioned around the hollowed-out component 206 and one or more sensors 506 may be positioned around the hollowed-out component 304. These sensors may be positioned such that they correspond to each other. For example, 504a and 506a may be positioned to correspond to each other; 504b and 506b may be positioned to correspond to each other; and 504c and 506c may be positioned to correspond to each other. In some implementations, sensors 504 and 506 may include infrared sensors. In those implementations, one or more alignments between the sensors 504 and 506 may be required. For example, alignment of two out of the three infrared sensor pairs as shown in FIG. 5 may be required. This condition may be detected by the control unit 308 on the vehicle 302. When such an alignment condition is not detected by the control unit 308, the control unit 308 may generate instruction to "fine tune" the position of vehicle 302 with respect to charging station 102a until the alignment condition is detected. For example, the control unit 308 may be configured to generate instructions to cause the self-driving system to position the vehicle 302 to its left, right, back and front within the charging station 102a until the alignment condition is detected.

Referring back to FIG. 3, the control unit 308 of the EV 302 can be configured to generate a request for charging the EV 302. For example, as mentioned above, the EV 302 may be equipped a sensor (not shown) to detect whether the hollowed-out components 206 and 304 are aligned. In response to the detection of the alignment, the control unit 308 may generate a request to charge the EV 302. Such a request can be received by the control unit 210 in the park spot 212 as described above. The control unit 308 can be configured to generate an instruction to convert the microwave or laser received by the power receiver 306 into electricity and to charge one or more batteries in the EV 302 with the converted electricity.

Figure 6:
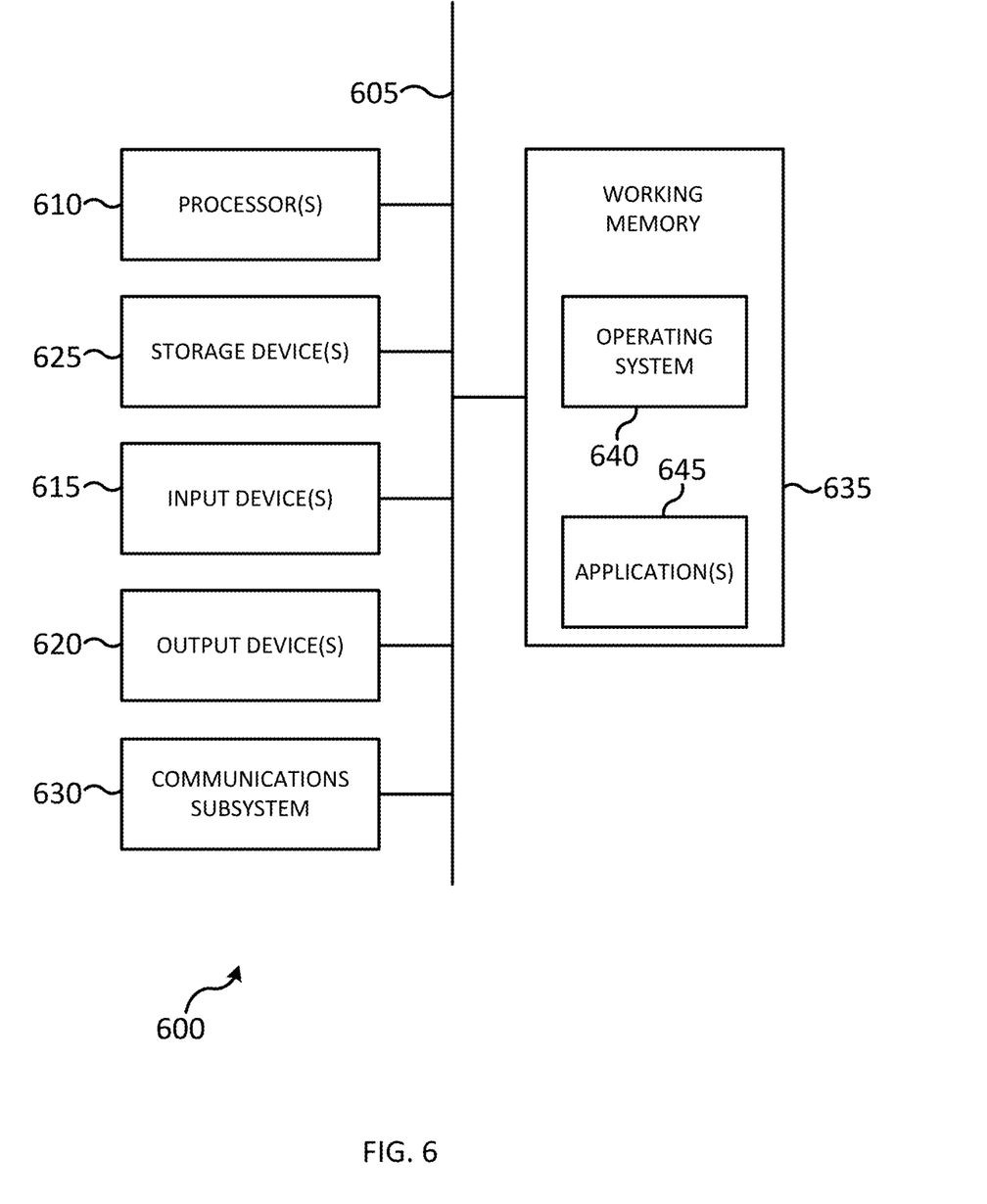
FIG. 6 illustrates one example of a computer system that can be used to implement various embodiments described and illustrated herein.

FIG. 6 illustrates a simplified computer system that can be used implement various embodiments described and illustrated herein. A computer system 600 as illustrated in FIG. 6 may be incorporated into devices such as a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 606, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 602.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device as an input device 615. In some embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 626. Volatile media include, without limitation, dynamic memory, such as the working memory 636.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A charging station for wireless power transmission, the charging station comprising a parking spot, the parking spot being configured to receive electric power from a power grid, wherein the parking spot comprises:
    a first control unit;
    a first hollowed-out component, wherein the first hollowed-out component comprises one or more first sensors configured to be coupled to one or more second sensors on a counterpart second hollowed-out component of an electric vehicle to align the first hollowed-out component with the second hollowed-out component;
    one or more guide posts provided around the parking spot, the one or more guide posts are configured to guide the electric vehicle to the parking spot; and
    a power transmitter provided in the first hollowed-out component; and, wherein
    the first control unit is configured to:
        receive a request to charge an electric vehicle;
        in response to the request being received, determine whether the second hollowed-out component is aligned with the first hollowed-out component through sensor inputs; and
        in determination that the second hollowed-out component is aligned with the first hollowed-out component, generate an instruction to convert the electric power received from the power grid to a radio medium having a frequency higher than 500 megahertz such that the radio medium is transmitted from the power transmitter to the electric vehicle.

2. The charging station of claim 1, wherein the radio medium includes microwave.

3. The charging station of claim 2, wherein the power transmitter is configured to transmit microwave to a power receiver mounted on a chassis of the electric vehicle.

4. The charging station of claim 1, wherein the radio medium includes a laser.

5. The charging station of claim 4, wherein the power transmitter is configured to transmit the laser to a power receiver mounted on a chassis of the electric vehicle.

6. The charging station of claim 1, wherein a power transmission rate at which the electric power is transmitted from the charging station to the electric vehicle is between 20 kilo watts per hour to 60 kilo watts per hour.

7. The charging station of claim 1, wherein voltage for the power transmission between the charging station and the electric vehicle is between 400 volts and 800 volts.

8. The charging station of claim 1, wherein the first control unit is further configured to generate an instruction to activate charging of the electric vehicle after the request has been received.

9. The charging station of claim 1, wherein the first control unit is further configured to generate an instruction to deactivate charging of the electric vehicle after an indication that the electric vehicle is fully charged has been received.

10. The charging station of claim 1, wherein the first control unit is further configured to:
    in determination that the second hollowed-out component is misaligned with the first hollowed-out component, generate an instruction to adjust position of the electric vehicle until the second hollowed-out component is aligned with the first hollowed-out component.

11. The charging station of claim 1, wherein the one or more first sensors and the one or more second sensors correspond to each other in position.

12. An electric vehicle configured for wireless power transmission, the electric vehicle comprising:
a second control unit;
a second hollowed-out component mounted on chassis of the electric vehicle, wherein the second hollowed-out component comprises one or more second sensors configured to be coupled to one or more first sensors on a counterpart first hollowed-out component of a parking spot to align the first hollowed-out component with the second hollowed-out component; and
a power receiver disposed within the second hollow-out component; and, wherein
the second control unit is configured to:
generate a request to charge an electric vehicle;
determine whether the second hollowed-out component is aligned with the first hollowed-out component through sensor inputs; and
in determination that the second hollowed-out component is aligned with the first hollowed-out component, generate an instruction to receive through the power transmitter a radio medium having a frequency higher than 500 megahertz, the radio medium being wirelessly received from a power transmitter of a charging station through the first hollow-out component and the second hollowed-out component.

13. The electric vehicle of claim 12, wherein the radio medium includes microwave.

14. The electric vehicle of claim 13, wherein the power receiver is configured to receive microwave.

15. The electric vehicle of claim 12, wherein the radio medium includes a laser.

16. The electric vehicle of claim 15, wherein the power receiver is configured to receive the laser.

17. The electric vehicle of claim 12, wherein a power transmission rate at which the electric power is transmitted from the charging station to the electric vehicle is between 20 kilo watts per hour to 60 kilo watts per hour.

18. The electric vehicle of claim 12, wherein voltage for the power transmission between the charging station and the electric vehicle is between 400 volts and 800 volts.

19. The electric vehicle of claim 12, wherein the second control unit is further configured to generate an instruction to transmit the request to the charging station.

20. The electric vehicle of claim 12, further comprising: one or more cameras configured to capture images of one or more guide posts provided around the parking spot in order to guide the electric vehicle to the parking spot.

* * * * *